United States Patent [19]

Nam

[11] Patent Number: 5,657,070
[45] Date of Patent: Aug. 12, 1997

[54] CIRCUIT FOR DRIVING AN LED PRINT HEAD OF AN ELECTRO-PHOTOGRAPHY MACHINE

[75] Inventor: Byung-Deok Nam, Suwon, Rep. of Korea

[73] Assignee: SamSung Electronics Co., Ltd., Kyungki-do, Rep. of Korea

[21] Appl. No.: 22,197

[22] Filed: Feb. 25, 1993

[30] Foreign Application Priority Data

Dec. 9, 1992 [KR] Rep. of Korea ............... 23718/1992

[51] Int. Cl.$^6$ ............... B41J 2/47; B41J 2/435; H04N 1/23
[52] U.S. Cl. .................. 347/237; 347/240; 358/298
[58] Field of Search ............... 346/107 R, 107 A, 346/154; 358/296, 298, 300, 302; 395/100, 108; 347/237, 240, 251, 183; 332/109

[56] References Cited

U.S. PATENT DOCUMENTS

| | | | |
|---|---|---|---|
| 4,074,319 | 2/1978 | Goldschmidt et al. | 358/302 X |
| 4,455,578 | 6/1984 | Fearnside | 347/237 X |
| 4,626,923 | 12/1986 | Yoshida | 358/298 X |
| 4,689,694 | 8/1987 | Yoshida | 347/237 X |
| 4,806,950 | 2/1989 | Sekine et al. | 347/183 X |
| 4,819,008 | 4/1989 | Nagato et al. | 358/298 X |
| 4,855,760 | 8/1989 | Kanayama | 358/296 X |
| 4,905,027 | 2/1990 | Itoh | 346/154 X |

*Primary Examiner*—Mark J. Reinhart
*Assistant Examiner*—David Yockey
*Attorney, Agent, or Firm*—Robert E. Bushnell, Esq.

[57] ABSTRACT

A circuit for driving an LED print head so as to be capable of printing a variety of gray levels, comprises a print controller for generating synchronizing signals and latch clock pulses to be applied to the LED print head, a video clock signal generator means for generating a predetermined number of video clock pulses in response to the sub-synchronizing signals, a video data generating means operated by the sub-synchronizing signals for generating a number of sub-data representing the contrast of one line data in response to the video clock pulses, a contrast mode decoding means for counting the latch clock pulses in one period of the sub-synchronizing signals to generate first, second, third and fourth enable signals, a contrast strobe pulse generating means for generating first, second and third strobe pulses of different periods in response to the first enable signal, and a drive circuit for logically combining the second, third and fourth signals and the first, second and third strobe pulses so as to drive the strobe pulses representing the contrast mode of a printed image to the strobe terminal.

21 Claims, 4 Drawing Sheets

CIRCUIT FOR DRIVING AN LED PRINT HEAD OF AN ELECTRO-PHOTOGRAPHY MACHINE

FIELD OF THE INVENTION

The present invention relates to a circuit for driving an LED print head, and specifically, a circuit for driving an LED print head so as to be capable of printing a plurality of gray levels between white and black in a laser printer.

BACKGROUND OF THE INVENTION

Electrophotography machines comprise an LED print head which is disposed to generate a pattern of light on a uniformly charged photo-sensitive drum. Specifically, light-emitting-diodes (LED) of the LED print head are selectively driven in dependence upon print data received by the LED print head. The regions of the photo-sensitive drum which are exposed to the pattern of light from the driven LED's become electrostatically charged thereby forming an electrostatic image on the surface of the photo-sensitive drum. These charged regions of the photo-sensitive drum attract and hold toner which is subsequently transferred from the drum onto paper. The toner is then fused to the paper by the application of heat.

LED print heads driven by conventional techniques have been deficient because they were incapable of printing multiple gray levels. That is, conventionally driven LED print heads can only print a single shade, black. Consequently, images printed by conventionally driven LED print heads comprise black regions where toner has been applied and white regions were no toner has been applied; the images do not contain intermediate shades of gray. Therefore, although conventional electrophotography machines can successfully reproduce text which includes only two tones, they have been ineffective at printing, for instance, pictures which must be printed with a variety of gray levels for accurate and effective reproduction.

SUMMARY OF THE INVENTION

It is an object of the present invention to provide an improved circuit for driving a LED print head.

It is another object of the present invention to provide a process and a circuit enabling a light emitting diode print head of an electrophotography machine to print $2^m$ gray levels, or more.

It is yet another object of the present invention to provide a process and a circuit for driving an LED print head of an electrophotography machine capable of printing $2^m$ gray levels, or more specifically, a circuit for driving an LED print head of a laser printing device capable of printing $2^m$ gray levels.

According to the principles of the present invention, a circuit for driving an LED print head comprises:

(a) a print control circuit for generating line synchronizing signals for synchronizing the printing of a line of print data, sub-synchronizing signals comprising a series of pulses corresponding to each bit per byte of the print data generated for each line synchronizing signal, latch clock pulses received by the LED print head and generated for each one of the sub-synchronizing signals but delayed in time;

(b) a video clock signal generating circuit for generating a predetermined number of video clock pulses in response to each sub-synchronizing signal;

(c) a video data generating circuit operated by the sub-synchronizing signals for generating print data subgroups representing gray levels of one line of print data;

(d) a level decoding circuit for generating first, second, third and fourth enable signals in response to a count of the latch clock pulses in one period of the line synchronizing signals;

(e) a strobe pulse generating circuit for generating first, second and third strobe pulses having periods corresponding to the significance of each bit of the bytes of print data; and (f) a drive circuit for logically combining the second, third and fourth enable signals and the first, second and third strobe pulses so as to selectively transfer one of the strobe pulses corresponding to significance of bits currently loaded into the LED print head.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
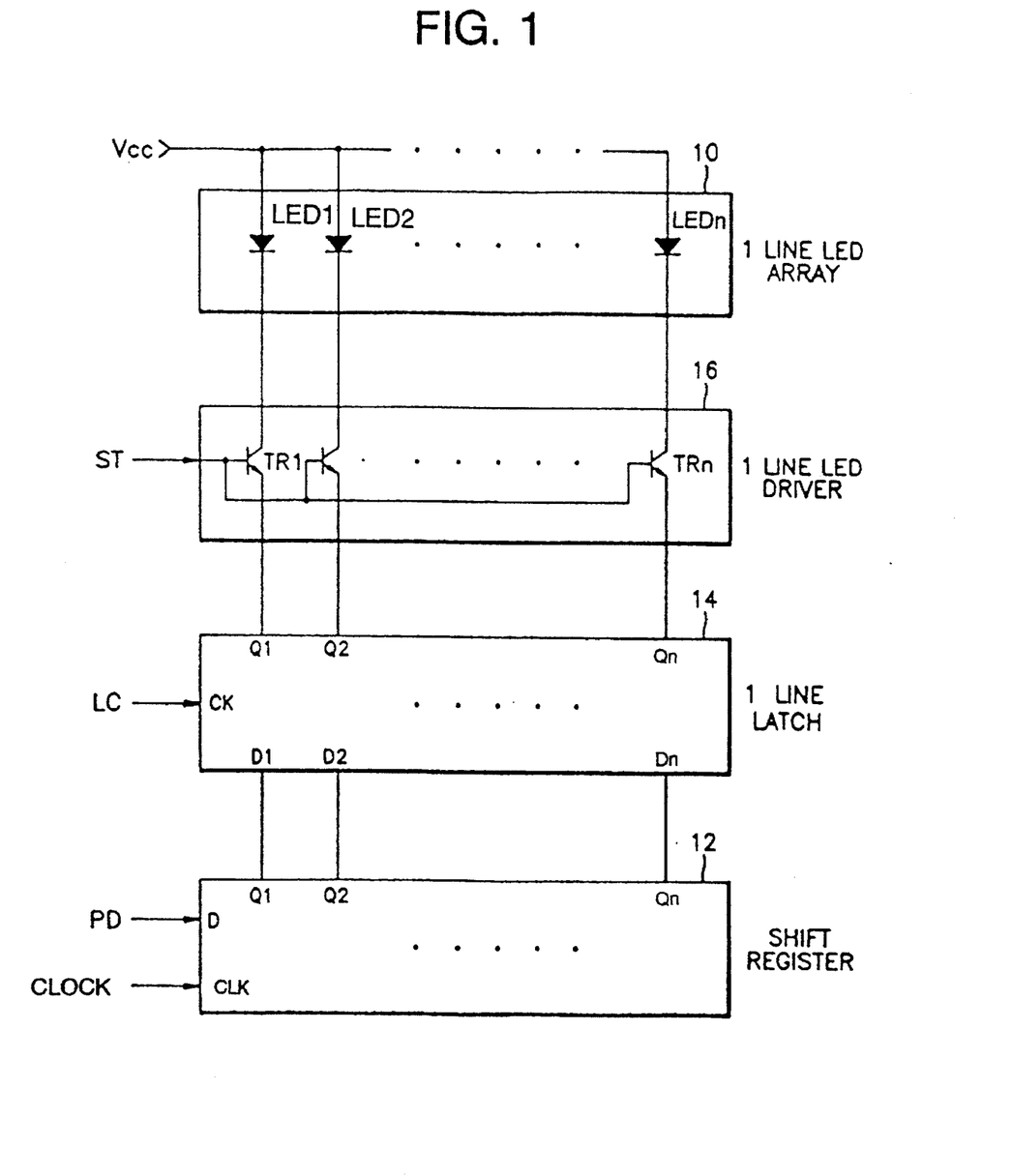
FIG. 1 is a block diagram of a conventional LED print head for an electrophotography machine.

Turning now to the figures, FIG. 1 illustrates the structure of a conventional LED print head. A line LED array 10 of the LED print head comprises a plurality of LED's, LEDn-LED1, connected to emit light in response to the sink current of their respective anodes. The cathodes of the LED's are connected to the source $V_{cc}$. The LED print head is positioned so that the light emitted by the LED's of the line LED array 10 illuminates or exposes a surface of a photo-sensitive drum (not shown). The light from each LEDn-LED1 causes a local electrostatic charge on the drum which will attract and hold toner.

A shift register 12 receives a line of print data PD containing n bits in a serial format which is shifted into the shift register in response to video clock pulses CLOCK. Once the n bits of print data PD have been loaded into the shift register, they are provided in parallel at each output Qn-Q1 of the shift register 12. A line latch 14 then latches the parallel print data provided by the shift register 12 in response to a latch clock pulse LC. The latching of the print data causes each output terminal, Qn-Q1, of the line latch 14 to enter a logic high or a logic low state in dependence upon the corresponding bit of the latched print data.

A strobe signal ST is provided to a line LED driver 16 and specifically to bases of bipolar junction transistors TRn-TR1. Each of the transistors TRn-TR1 is connected between a corresponding one of LEDn-LED1 of the line LED array 10 and an output terminal of the line latch 14.

When the strobe signal ST enters a high state, each of the transistors TRn-TR1 is rendered conductive so that the LEDn-LED1 are selectively driven in dependence upon the print data latched in the line latch 14. For example, if the terminal D1 of the line latch 14 is a logic "0", LED1 will be driven when the strobe signal ST enters the high state. Once the strobe signal ST returns to a low state, the drum will be advanced so that a next region of the drum can be exposed in response to a next line of print data.

As described above, each of LEDn-LED1 is driven in dependence upon a single data bit per line. If the LED of the line LED array 10 is driven, it will generate a black dot, whereas if the single bit is a logic "1", the corresponding LED will not be driven, leaving a white spot. Consequently, a byte of the print data which controls the driving of a single LED in a single line contains a single bit.

Figure 2:
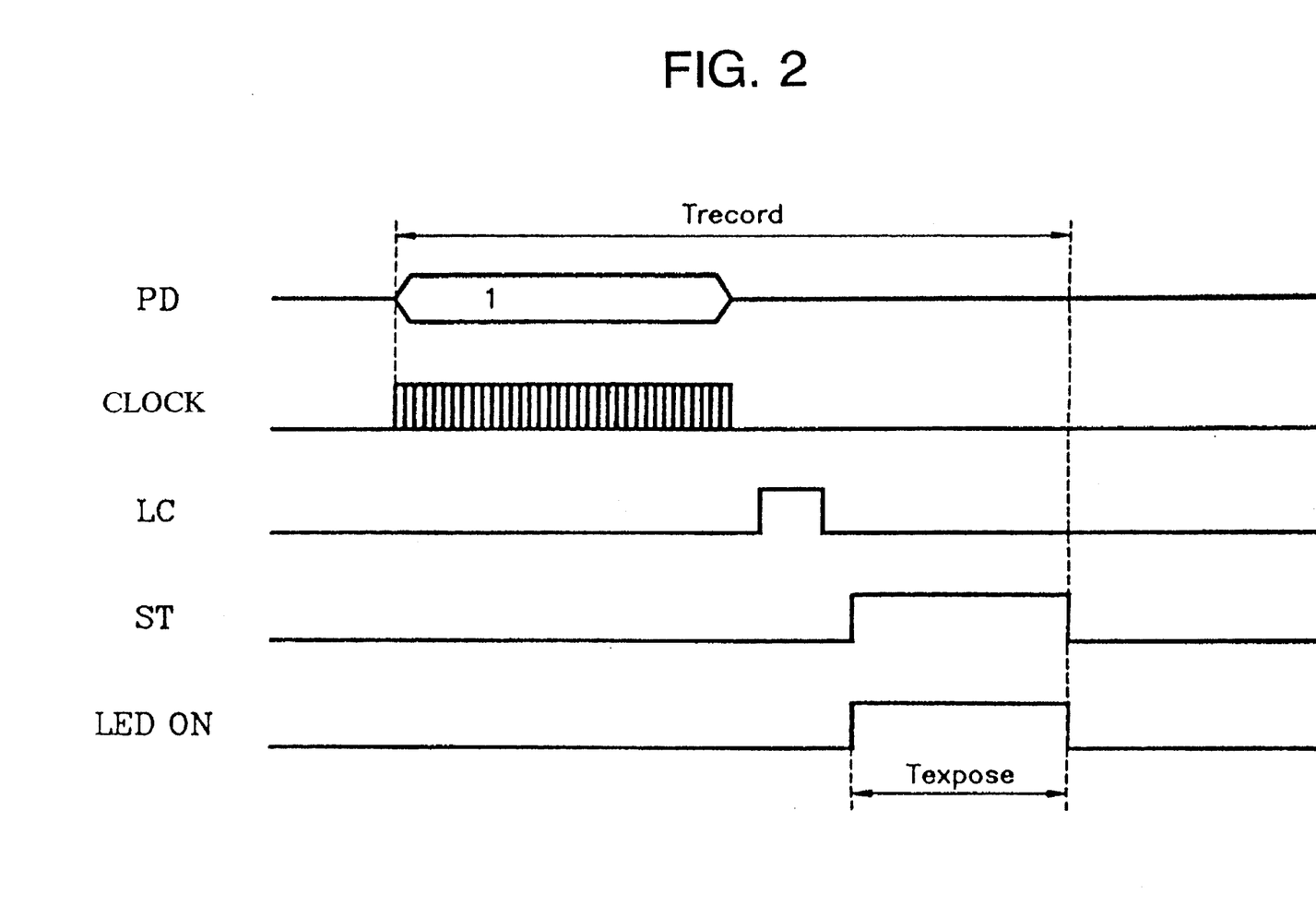
FIG. 2 is a timing diagram of signals controlling the LED print head of FIG. 1 according to a conventional technique.

FIG. 2 illustrates the signals for driving the LED print head of FIG. 1. Specifically, the print data PD is shifted into the shift register 12 in response to the video clock pulses CLOCK. Once this print data PD is completely shifted into the shift register 12, the latch clock pulse LC enters a high state so that the print data of the shift register 12 is latched in the line latch 14. When this print data PD is latched in the line latch 14, the strobe signal ST enters a high state so that each of LEDn-LED1 in the LED line array 10 can be selectively driven in response to the print data latched in the line latch 14.

A line print period Trecord represents the time necessary for printing one line of the print data PD. A full exposure time period Texpose represents the time which the LED's must be driven to generate an adequate charge on the photo-sensitive drum so that enough toner is attracted to drum to print a black dot. That is, if the exposure of the photo-sensitive print drum by the LED is less than the time Texpose, an insufficient quantity of toner will be transferred to the photo-sensitive drum generating a gray dot.

Figure 3:
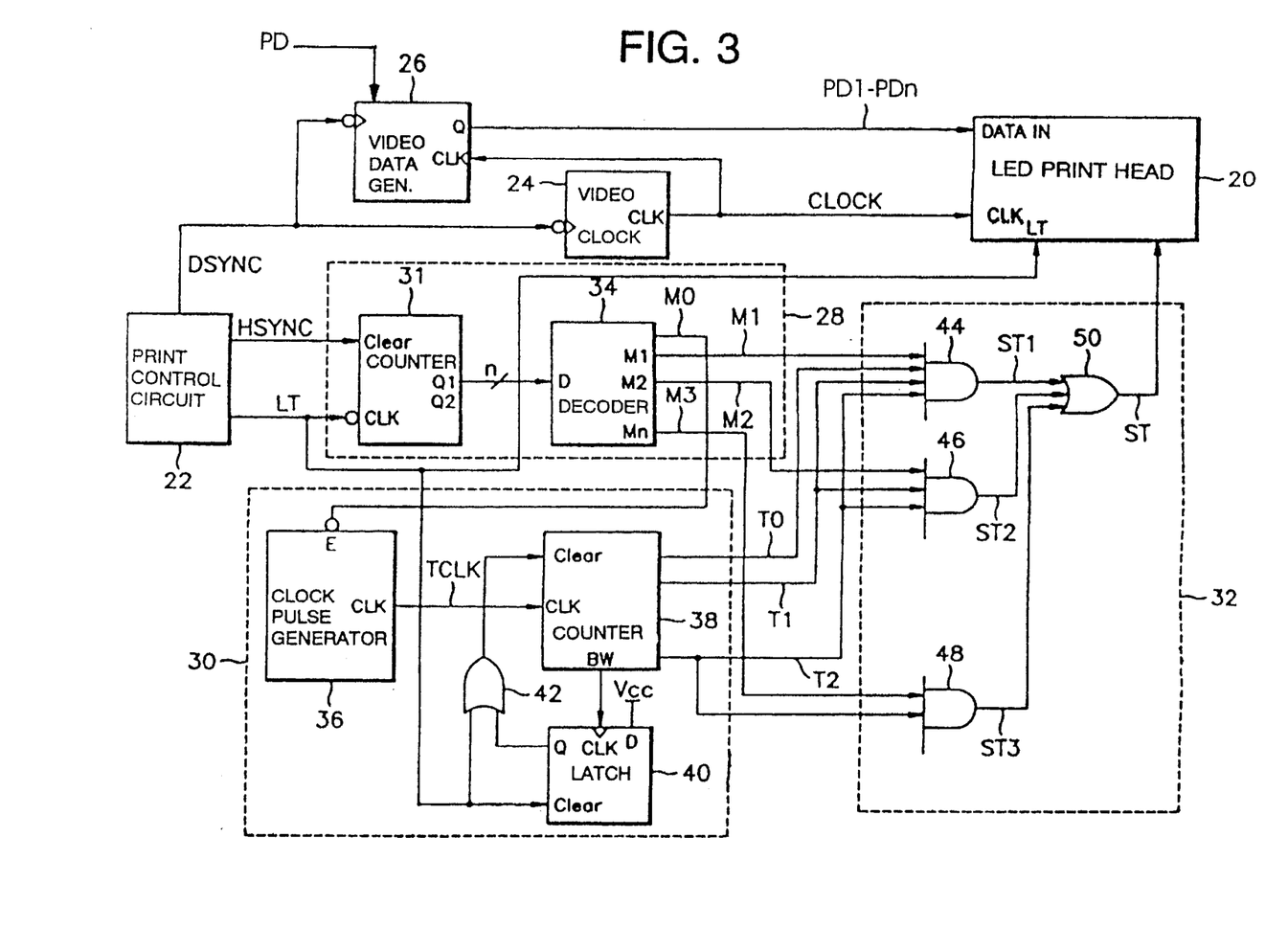
FIG. 3 is a circuit for driving the LED print head according to the present invention.

Referring to FIG. 3, a circuit for controlling an LED print head constructed according to the principles of the present invention is illustrated. The LED print head of FIG. 1 corresponds to the LED print head 20 of FIG. 3, i.e., the LED print head 20 would be constructed substantially the same as that of FIG. 1; the terminals DATA IN, CLK, and LT of LED print head 20 correspond to the terminals D, CLK, and CK, respectively, in FIG. 1.

Figure 4:
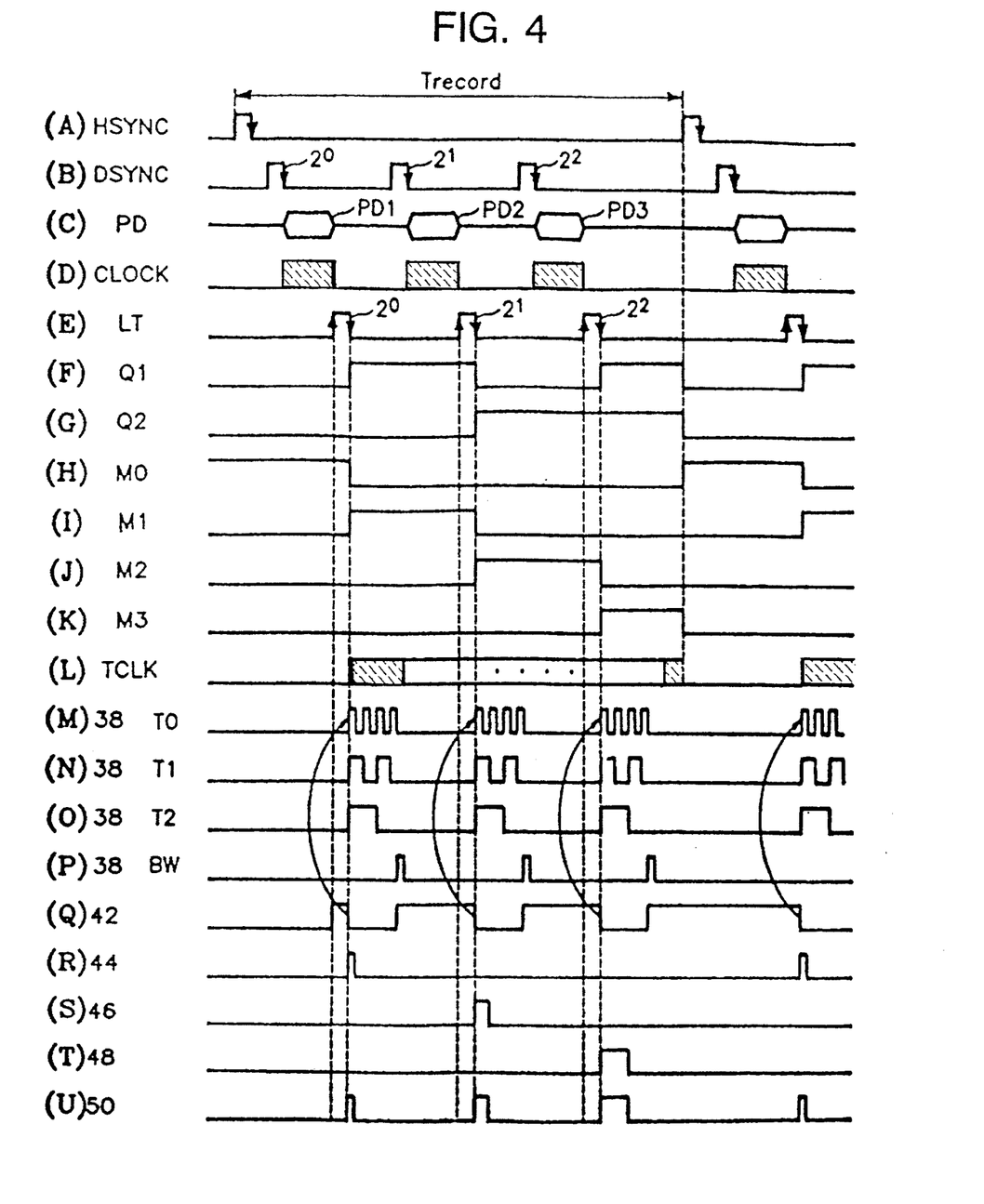
FIG. 4 is a timing diagram of signals generated by the circuit of FIG. 3 for controlling the LED print head according to the inventive technique.

The circuit for controlling the LED print head 20 includes a print control circuit 22 which generates line synchronizing signals HSYNC, see FIG. 4A, that signal the printing of a line of print data. The contrast print control circuit 22 also generates a plurality of sub-synchronizing signals DSYNC, see FIG. 4B, for each line of print data. The number of sub-synchronizing signals generated for each line corresponds the number of bits per byte of the print data. For each sub-synchronizing signal DSYNC, a latch clock pulse LT, see FIG. 4E, is also generated, but the latch clock pulses are delayed in time from sub-synchronizing signals DSYNC. The print control circuit 22 may be a transistor-transistor-logic (TTL) circuit or a microcomputer.

A video clock signal generating circuit 24 generates a predetermined number of video clock pulses CLOCK, see FIG. 4D, in response to the transition of the sub-synchronizing signals DSYNC from high to low. The video clock pulses CLOCK control the video print head 20 to shifhead 20 to shift in data sub-groups PD1-PDn of the print data PD. Consequently, n video clock pulses are generated in response to each sub-synchronizing signal DSYNC so that each bit of the data is shifted into the LED print head.

A video data generating circuit 26 received all the print data PD for one line and forms the data sub-groups PD1-PDn. The video data generating circuit 26 then successively provides each of the data sub-groups in response to the sub-synchronizing signals DSYNC and the video clock pulses CLOCK.

A level decoding circuit 28 counts the latch clock pulses LT for each period of the line synchronizing signals HSYNC to generate first, second, third and fourth enable signals M0-M3, see FIGS. 4H-4K.

A strobe pulse generating circuit 30 generates first, second and third strobe pulses T0-T2, FIGS. 4M-4O, each having different widths in response to the first enable signals M0 the latch clock pulses LT.

A drive circuit 32 logically combines the second, third and fourth enable signals M1-M3 and the first, second and third strobe pulses T0-T2 to provide the one of the strobe pulses corresponding the data sub-group of the print data PD currently latched in the print head 20. The strobe pulses provided by the drive circuit 32 are received as the strobe signal ST by the LED print head 20.

The level decoding circuit 28 comprises a latch counter 31 which is initialized by the line synchronizing signals HSYNC to count the latch clock pulses LT. Also included is a decoder 34 for decoding the count signal of the latch counter 31 so as to generate the first, second, third and fourth enable signals M0-M3. The enable signals M1-M3 respectively enable transmission of individual ones of the strobe signals T0-T2 in dependence upon the data sub-group of print data PD1-PDn currently latched in the LED print head 20.

The strobe pulse generating circuit 30 comprises a clock pulse generator 36 for generating clock pulses TCLK, see FIG. 4L, in response to the first enable signal M0. The clock pulses TCLK determine a light exposing time of the drum by the LED's. A down counter 38 down counts the clock pulses TCLK to generate the first, second and third strobe pulses T0-T2 and a borrow signal BW, see FIG. 4P. A latch circuit 40, initialized by the latch clock pulses LT, latches the borrow signal BW. An OR-gate 42 logically combines the latch clock pulses LT and borrow signal BW to generate a reset signal, see FIG. 4Q, of the down counter 38.

The time required for an LED in the LED print head 20 to emit light to make a black dot is Texpose. The clock pulse generating circuit 36 generates the clock pulses TCLK having a period of Texpose/($2^m-1$), wherein m is the number of bits per byte of print data PD. The down counter 38 down counts the clock pulses TCLK so as to generate the first, second and third strobe pulses T0-T2 with respective periods of $1/(2^m-1)$, $2(2^m-1)$ and $4/(2^m-1)$.

The drive circuit 32 comprises a first AND gate 44 for logically multiplying the second enable signal M1 with the first, second and third strobe pulses T0-T2 to gate the first strobe pulse T0, see FIG. 4R. A second AND gate 46 logically multiplies the third enable signal M2 with the second and third strobe pulses T1-T2 to gate the second strobe pulse T1, see FIG. 4S. A third AND gate 48 logically multiplies the fourth enable signal M3 and the third strobe signal T2 to gate the third strobe pulse T2, see FIG. 4T. Finally, an OR-gate 50 logically combines the signal outputs of the first, second and third AND gates 44, 46, 48 to produce the strobe signal ST, see FIG. 4U, received by the print head 20.

FIGS. 4A-4U represent a timing diagram for the signals generated by the circuit of FIG. 3. Specifically, FIG. 4A illustrates the line synchronizing signals HSYNC generated by the print control circuit 22, FIG. 4B illustrates the sub-synchronizing signals DSYNC generated by the print control circuit 22, and FIG. 4C illustrates the print data of one-line by the video data generating circuit 26. The print data PD includes first, second, and third data sub-groups PD1–PD3, of which the first data sub-group PD1 contains the least significant bits of the print data bytes, second data sub-group PD2 contains the second most significant bits of the print data bytes, and PD3 contains the most significant bits of the print data bytes. FIG. 4D illustrates the video clock pulses CLOCK generated by the video clock signal generating circuit 24. FIG. 4E illustrates the latch clock pulses LT generated by the print control circuit 22. FIGS. 4F and 4G illustrate the outputs Q1 and Q2 of the latch counter 31. FIGS. 4H to 4K illustrate the first through fourth enable signals M0–M3 generated by the decoder 34. FIG. 4L illustrates the clock pulses TCLK generated by the clock signal generating circuit 36. FIGS. 4M to 4P illustrate the first through third strobe signals T0–T2 generated by the down counter 38. FIG. 4Q illustrates the down counter reset signal generated by OR gate 42. FIGS. 4R to 4T illustrate the signal outputs of the first to third AND gates 44, 46, 48, and FIG. 4U illustrates the strobe signals ST generated by the OR gate 50.

The operation of the inventive circuit will now be described with reference to FIG. 3 and FIGS. 4A–4U. First an entire line of print data PD is stored in the video data generating circuit 26, and the print control circuit 22 responds to a line print command by generating the line synchronizing signal HSYNC, see FIG. 4A, which is applied as a clear signal to the latch counter 31. The print control circuit 22 thereafter produces the sub-synchronizing signals DSYNC and latch clock pulses LT, see FIGS. 4B and 4E, which are applied to the video clock signal generating circuit 24, video data generating circuit 26, latch counter 31, OR-gate 42 and the LED print head 20.

The video clock signal generating circuit 24 is triggered by the falling edge of the sub-synchronizing signal DSYNC, as shown in FIG. 4B, so as to produce n video clock pulses corresponding to the LEDn-LED1 in the LED print head 20. The video data generating circuit 26 is triggered by the first falling edge of the sub-synchronizing signals DSYNC, FIG. 4B, provides each bit of a first data sub-group PD1 of the print data PD in synchronism with the video clock pulses CLOCK to the LED print head 20. For instance, in the case of printing on A4 paper with a print resolution of 300 dots-per-inch (DPI), 2560 video clock pulses are applied to the video data generating circuit 26 and LED print head 20 for each transition of the sub-synchronizing signal DSYNC from high to low.

The first data sub-group PD1 contains the least significant bits of each byte of print data. Each byte indicates the gray level to be printed by an LED of the print head 20 for a line. Subsequently, the video data generating circuit 26 sequentially provides the second and third sub-groups PD2 and PD3 in response to the second and third falling edges of the sub-synchronizing signals DSYNC. The first sub-group PD1 contains the $2^0$ place bits of the print data for the current line, similarly, PD2 contains the $2^1$ place bits, and PD3 contains the $2^2$ place bits of each byte.

When the latch counter 31 is cleared by the high logic state of the line synchronizing signal HSYNC, latch counter signals Q1 and Q2 are generated as shown in FIGS. 4F and 4G in response to the sub-synchronizing signals DSYNC.

The LED print head 20 first shifts in the first data sub-group PD1 according to the video clock pulses CLOCK. The shifted one-line first sub-group of print data is latched in response to the rising edge of the latch clock pulses LT as shown in FIG. 4E.

The latch counter 31 is cleared by the high logic level of the line synchronizing signal HSYNC and then counts the latch clock pulses LT to produce the count signal Q1 and Q2, as shown in FIGS. 4F and 4G, which are applied to the decoder 34. The decoder 34 decodes the count signal to produce the first, second, third and fourth enable signals M0, M1, M2, M3, as shown in FIGS. 4H, 4I, 4J and 4K, respectively. The fourth enable signals M0 is applied to the clock signal generating circuit 36 whereas the first through third enable signals are applied to the first, second and third AND gates 44, 46 and 48. The second through fourth enable signals M1–M3 determine timing of the strobe pulses.

The clock signal generating circuit 36 produces the light exposing clock pulses TCLK, as shown in FIG. 4L, in response to the logic low level of the first enable signal M0 as shown in FIG. 4H. The light exposing clock pulses TCLK have the period of $Texpose/(2^m-1)$. The down counter 38 cleared by the latch clock pulses LT down counts the light exposing clock pulses TCLK with the number system having $2^m-1$ as its base to produce the first, second and third strobe pulses T0, T1 and T2 as shown in FIGS. 4M, 4N and 4O. Thereafter, the down counter 38 generates the borrow signal BW, as shown in FIG. 4P, which is applied to the clock terminal of the latch circuit 40. The latch circuit 40 latches a clear signal being logic high in response to the borrow signal BW, thus clearing the down counter 38. Since the latch circuit 40 is cleared by the falling edge of the latch clock pulse LT, the down counter 38 produces the first, second and third strobe pulses T0, T1 and T3 in a period of the line synchronizing signal HSYNC. Hence, the first, second and third strobe pulses T0, T1 and T2 have periods of $\frac{1}{7}\times Texpose$, $\frac{2}{7}\times Texpose$ and $\frac{4}{7}\times Texpose$, respectively.

Meanwhile, the first AND gate 44 logically multiplies the second enable signal M1 and the first, second and third strobe pulses T0, T1 and T2 to gate the first strobe pulse T0 as shown in FIG. 4R. The second AND gate 46 logically multiplies the third enable signal M2 and the second and third strobe signals T1 and T2 to gate the second strobe pulse T1 as shown in FIG. 4S. The third AND gate 48 logically multiplies the fourth enable signal M3 and third strobe signal T2 to gate the third strobe signal T2 as shown in FIG. 4T. These strobe pulses are logically combined by the fourth OR gate 50 and applied as the strobe signal ST to the LED print head 20. Thus, the drive circuit 32 gates the strobe pulses as shown in FIGS. 4R, 4S and 4T according to the latch clock pulses LT generated by the print control circuit 22. Hence the LED array of the LED print head 20 produces a light exposure corresponding to each of the sub-groups PD1, PD2 and PD3 in response to the first, second and third strobe pulses T0, T1 and T2 provided by the first, second and third gates 44, 46 and 48.

The eight gray levels which include white and black are printed as follows:

If the gray level to be printed by LED1, for example, of the LED print head is "0" (white), the bits corresponding to the LED1 of sub-groups PD1, PD2 and PD3 sequentially produced from the video data generating circuit 26 all have a "0" logic state. Therefore, the first, second and third strobe pulses T0, T1 and T2 sequentially generated from the fourth gate 50 as shown in FIG. 4U do not drive the LED1 of the LED print head 20.

If the gray level is "1", the video data generating circuit 26 generates bits corresponding to LED1 in data sub-groups PD1, PD2 and PD3 of "1", "0" and "0", respectively. Therefore, the first strobe pulse T0 as shown in FIG. 4R drives the LED1 for a time period $\frac{1}{7}\times Texpose$, exposing the portion of the drum for a time period corresponding to the lightest gray level.

If the gray level is "2", the video data generating circuit 26 generates the sub-groups PD1, PD2 and PD3 having corresponding values of "0", "1" and "0", respectively. Therefore, the second strobe pulse T1 drives the LED array for ⅔×Texpose, exposing the portion of the drum for a time period corresponding to the next darker gray level.

Table 1 shows relationship between the gray levels, the data sub-groups of print data, and strobe pulses ST.

TABLE 1

| Gray level | Sub-group print data | | | Output Strobe Pulses(ST) | |
|---|---|---|---|---|---|
| | PD3 | PD2 | PD1 | | |
| 0H | 0 | 0 | 0 | none | (White) |
| 1H | 0 | 0 | 1 | T0 | |
| 2H | 0 | 1 | 0 | T1 | |
| 3H | 0 | 1 | 1 | T0 + T1 | |
| 4H | 1 | 0 | 0 | T2 | (Memium gray) |
| 5H | 1 | 0 | 1 | T0 + T2 | |
| 6H | 1 | 1 | 0 | T1 + T2 | |
| 7H | 1 | 1 | 1 | T0 + T1 + T2 | (Black) |

Thus, the LED print head 20 drives the LED array in response to the strobe signals ST generated from the drive circuit 32 and selectively turns on each of the LED's according to the sub-groups of print data PD1, PD2 and PD3, thereby illuminating the photosensitive drum with light according the print data.

It will be readily appreciated by those skilled in the art that the number of gray levels greater than $2^3$ may be achieved by adjusting the number of the sub-synchronizing signals DSYNC and latch pulses and by adding certain circuit elements without departing the scope of the present invention.

In the present embodiment, the hardware construction is employed to control the light emitting duration of the LED's so as to vary the time for exposing the photosensitive drum. A microcomputer properly programmed could achieve a similar effect. Further, the principles of the present invention could be applied to a printer with a thermal head array in place of the LED print head.

As stated above, the inventive circuit varies the driving time of the LED's in the print head in $2^m$ steps so that a corresponding number of gray levels may be represented.

What is claimed is:

1. A circuit for driving a LED print head in an electrophotography machine, said LED print head having a print data input terminal for receiving print data, a clock terminal for receiving clock pulses controlling shifting of said print data, a latch terminal for receiving latch clock pulses for controlling latching of said print data, and a strobe terminal for receiving strobe signals, wherein a photosensitive drum is exposed to light from said LED print head in response to said print data for time periods determined by said strobe signals, said circuit for driving said LED print head comprising:

print control means for generating a plurality of signals, said plurality of signals comprising line synchronizing signals indicating printing of a line of said print data, sub-synchronizing signals for controlling grouping of said line of said print data into data sub-groups and said latch clock pulses, each of said latch clock pulses corresponding to a respective one of each of said sub-synchronizing signals;

video clock signal generating means for generating a predetermined number of video clock pulses in response to each one of said sub-synchronizing signals;

video data generating means receiving said line of print data and grouping said line of print data into a plurality of data sub-groups in response to said sub-synchronizing signals and said video clock pulses, each of said data sub-groups being output to said print data input terminal;

mode decoding means for generating first enable signals, second enable signals, third enable signals, and fourth enable signals by counting said latch clock pulses, said counting being initialized in response to said line synchronizing signals;

strobe pulse generating means for generating first strobe pulses, second strobe pulses, and third strobe pulses, each having different periods, in response to said first enable signals and said latch clock pulses; and driving means for generating said strobe signals received at said strobe terminal by logically combining said second enable signals, said third enable signals, and said fourth enable signals with said first strobe pulses, said second strobe pulses, and said third strobe pulses.

2. A circuit for driving said LED print head as defined in claim 1, wherein said mode decoding means comprises a latch counter for generating counts of said latch clock pulses and a decoder for decoding said counts to generate said first enable signals, said second enable signals, said third enable signals, and said fourth enable signals.

3. A circuit for driving said LED print head as defined in claim 2, wherein said strobe pulse generating means comprises:

clock pulse generating means for generating light exposing clock pulses in response to said first enable signal said light exposing clock pulses denoting a light exposing time of said photosensitive drum by said LED print head;

down counting means for down counting in response to said light exposing clock pulses to generate said first strobe pulses, said second strobe pulses and said third strobe pulses and a borrow signal;

latching means initialized by said latch clock pulses for latching said borrow signal; and reset means for logically combining said latch clock pulses and said borrow signal to reset said down counting means.

4. A circuit for driving said LED print head as defined in claim 2, wherein said strobe pulse generating means comprises:

clock pulse generating means for generating light exposing clock pulses in response to said first enable signal, said light exposing clock pulses denoting a light exposing time of said photosensitive drum by said LED print head; and down counting means initialized by said latch clock pulses for down counting said light exposing clock pulses generated by said clock pulse generating means to generate said first strobe pulses, said second strobe pulses, and said third strobe pulses.

5. A circuit for driving said LED print head as defined in claim 3, wherein said light exposing clock pulses generated by said clock pulse generating means have a period of $Texpose/(2^m-1)$, wherein Texpose comprises a maximum exposure time of said photosensitive drum by an LED in said LED print head, and m equals a number of bits denoting a length of time each LED of said LED print head is driven for each line of said print data.

6. A circuit for driving said LED print head as defined in claim 4, wherein said light exposing clock pulses generated by said clock pulse generating means have a period of Texpose($2^m-1$), wherein Texpose is a maximum exposure time of said photosensitive drum by an LED in said LED print head, and m is a number of bits denoting a length of time each LED of said LED print head is driven for each line of said print data.

7. A circuit for driving said LED print head as defined in claim 5, wherein said down counting means counts down in response to said light exposing clock pulses so as to produce said first strobe pulses, said second strobe pulses, and said third strobe pulses, said first strobe pulses, said second strobe pulses, and said third strobe pulses having periods of $1/(2^m-1)$, $2/(2^m-1)$ and $4/(2^m-1)$, respectively.

8. A circuit for driving said LED print head as defined in claim 3, wherein said driving means comprises:
   first gating means for logically multiplying said second enable signals and said first, second and third strobe pulses to gate said first strobe pulses,
   second gating means for logically multiplying said third enable signals and said second and third strobe pulses to gate said second strobe pulses,
   third gating means for logically multiplying said fourth enable signals and said third strobe pulses to gate said third strobe pulses, and
   fourth gating means for logically combining the outputs of said first, second and third gating means to produce said strobe signals.

9. A circuit for driving said LED print head as defined in claim 4, wherein said driving means comprises:
   first gating means for logically multiplying said second enable signals and said first, second and third strobe pulses to gate said first strobe pulses,
   second gating means for logically multiplying said third enable signals and said second and third strobe pulses to gate said second strobe pulses,
   third gating means for logically multiplying said fourth enable signals and said third strobe pulses to gate said third strobe pulses, and
   fourth gating means for logically combining the outputs of said first, second and third gating means to produce said strobe signals.

10. A method for driving a LED print head in an electrophotography machine, said LED print head having a print data input terminal for receiving print data, a clock terminal for receiving clock pulses controlling shifting of said print data, latch terminal for receiving latch clock pulses controlling latching of said print data; and a strobe terminal for receiving strobe signals, wherein a photosensitive drum is exposed to light from said LED print head in response to said print data for a time period determined by said strobe signals, said method for driving said LED print head comprising the steps of:
   storing a line of print data;
   generating line synchronizing signals sub-synchronizing signals and said latch clock pulses, each one of said latch clock pulses respectively corresponding to each one of said sub-synchronizing signals;
   generating a predetermined number of video clock pulses in response to each one of said sub-synchronizing signals;
   grouping said line of print data into data sub-groups and providing said data sub-groups to said print data input terminal in response to said sub-synchronizing signals and said video clock pulses;
   generating first enable signals, second enable signals, third enable signals, and fourth enable signals in response to a count of said latch clock pulses, said count being initialized in response to said line synchronizing signals;
   generating first strobe pulses, second strobe pulses, and third strobe pulses each having different periods in response to said first enable signals and said latch clock pulses; and
   generating said strobe signals received at said strobe terminal in response to logical combinations of said second enable signals, said third enable signals, and said fourth enable signals with said first strobe pulses, said second strobe pulses, and said third strobe pulses.

11. A circuit for driving a print head having a plurality of light emitting diodes for printing a line of information, said circuit comprising;
   means for generating first synchronizing signals;
   means for generating second synchronizing signals;
   means for generating latch clock pulses, said latch clock pulses being provided to a latching terminal of said print head;
   means for generating a predetermined number of video clock pulses in response to each one of said second synchronizing signals;
   video data generating means for receiving a plurality of words representing a line of print data, each of said words having a predetermined number of bits representing information to be printed in gray scale, said video data generating means outputting a plurality of video data in a plurality of successive groups to said plurality of light emitting diodes in response to said second synchronizing signals and said video clock pulses, a first one of said groups comprising a least significant bit of said predetermined number of bits for each of said words and a last one of said groups comprising a most significant bit of said predetermined number of bits for each of said words;
   decoding means for receiving said first synchronizing signals and said latch clock pulses, said decoding means generating a plurality of enable signals in response to said first synchronizing signals and said latch clock pulses;
   strobe pulse generating means for generating a plurality of strobe pulses in response to said latch clock pulses and one of said plurality of enable signals, said plurality of strobe pulses being equal in number to said predetermined number of bits; and
   driving means responsive to said plurality of enable signals and said plurality of strobe pulses for selectively outputting one of said plurality of strobe pulses for driving a line driver of said print head.

12. The circuit as set forth in claim 11, said decoding means comprising:
   a first counter being initialized in response to said first synchronizing signals, for counting said latch clock pulses, and for generating a count signal in response to a count of said latch clock pulses attained during a period of said first synchronizing signals; and
   a decoder for decoding said count signal to generate first, second, third and fourth enable signals as said plurality of enable signals.

13. The circuit as set forth in claim 12, said strobe pulse generating means comprising:

a clock pulse generator for generating clock pulses having a period of Texpose/($2^m-1$), wherein Texpose comprises a maximum exposure time of a photosensitive drum exposed to light emitted from said plurality of light emitting diodes of said print head, and m equals said predetermined number of bits and denotes a length of time each of said plurality of light emitting diodes is driven for each line of information;

a second counter for generating first, second and third strobe pulses and for generating a borrow signal, said first, second and third strobe pulses having periods of $1/(2^m-1)$, $2/(2^m-1)$ and $4/(2^m-1)$, respectively;

a latch having a clock input for receiving said borrow signal, a data terminal connected to a supply voltage, and an output terminal for outputting a pulse in response to said borrow signal, said latch being cleared in response to said latch clock pulse; and a first OR gate having a first input connected to said output terminal of said latch and a second input connected to receive said latch clock pulse, an output terminal of said OR gate being connected to a clear input of said second counter.

14. The circuit as set forth in claim 13, said driving means comprising:

a first AND gate for receiving said second enable signal and said first, second and third strobe pulse;

a second AND gate for receiving said third enable signal and said second and third strobe pulses;

a third AND gate for receiving said fourth enable signal and said third strobe pulse; and a second OR gate for receiving said first strobe pulse gated by said first AND gate, said second strobe pulse gated by said second AND gate and said third strobe pulse gated by said third AND gate, said second OR gate selectively outputting one of said first, second and third strobe pulses as said one of said plurality of strobe pulses for driving a line driver of said print head.

15. A device for driving print elements to be capable of printing a plurality of gray levels in response to print data comprising data bytes, wherein said data bytes each have a plurality of bits, each bit of said plurality of bits being of different significance, significance of a bit denoting a position of said bit in a data byte, each of said data bytes determining a gray level to be printed by a corresponding one of said print elements, said device comprising:

means for generating a plurality of signals, said plurality of signals comprising a line synchronizing signal, sub-synchronizing signal, and a latch signal comprised of a plurality of latch pulses;

means for dividing said print data into data sub-groups in response to said sub-synchronizing signal, each of said data sub-groups being comprised only of bits of same significance, respectively, said bits of said sub-groups corresponding to each one of said print elements;

means for successively receiving each one of said data sub-groups as a current sub-group, and for enabling said print elements to be driven in response to corresponding bits of said current sub-group, wherein said means for successively receiving each one of said data sub-groups comprises means for latching said current sub-group in response to said latch signal to provide sink currents to said print elements in dependence upon said current sub-group;

means responsive to said line synchronizing signal for counting said latch pulses to generate a plurality of enable signals;

means for generating a plurality of strobe pulses in response to a first one of said plurality of enable signals, respective ones of said plurality of strobe pulses having durations corresponding to the significance of said bits in said current sub-group; and means for driving print elements in response to said plurality of enable signals and said plurality of strobe pulses.

16. The device as set forth in claim 15, said means for generating a plurality of signals comprising a print control circuit.

17. The device as set forth in claim 15, said means for counting said latch pulses comprising a counter having a clock input terminal for receiving said latch pulses and a clear input terminal for receiving said line synchronizing signal, said counter generating a count signal in response to a count of said latch pulses.

18. The device as set forth in claim 17, said means for counting said latch pulses further comprising a decoder for decoding said count signal generated by said counter, said decoder generating said plurality of enable signals.

19. The device as set forth in claim 15, said means for generating a plurality of strobe pulses comprising a clock generator for generating a plurality of clock pulses in response to said first one of said plurality of enable signals, a down counter for generating said plurality of strobe pulses and a borrow signal by counting said clock pulses in response to a reset signal, and reset means for generating said reset signal in response to said borrow signal and said latch signal.

20. The device as set forth in claim 19, said reset means comprises a latch having a clock input for receiving said borrow signal, a clear input for receiving said latch signal, a data input connected to a voltage source, and an OR gate having a first input terminal connected to an output terminal of said latch, a second input terminal connected to receive said latch signal and an output terminal for outputting said reset signal.

21. The device as set forth in claim 15, said means for driving print elements comprising a plurality of logic gates for logically combining predetermined ones of said plurality of enable signals with said plurality of strobe pulses.

* * * * *